United States Patent
Lee et al.

(10) Patent No.: US 12,135,992 B2
(45) Date of Patent: Nov. 5, 2024

(54) REMEDIATING DRIFT IN THE CLOUD

(71) Applicant: Microsoft Technology Licensing, LLC, Redmond, WA (US)

(72) Inventors: Yu-Chieh Lee, Santa Clara, CA (US); Vaibhav Tandon, Santa Clara, CA (US); Dhaval H. Patel, Fremont, CA (US)

(73) Assignee: Microsoft Technology Licensing, LLC, Redmond, VA (US)

( * ) Notice: Subject to any disclaimer, the term of this patent is extended or adjusted under 35 U.S.C. 154(b) by 669 days.

(21) Appl. No.: 17/357,529

(22) Filed: Jun. 24, 2021

(65) Prior Publication Data

US 2023/0004431 A1  Jan. 5, 2023

(51) Int. Cl.
G06F 9/46 (2006.01)
G06F 9/445 (2018.01)
G06F 9/50 (2006.01)

(52) U.S. Cl.
CPC ........ G06F 9/5005 (2013.01); G06F 9/44505 (2013.01)

(58) Field of Classification Search
CPC .......................... G06F 9/5005; G06F 9/44505
See application file for complete search history.

(56) References Cited

U.S. PATENT DOCUMENTS

2021/0028993 A1  1/2021  Kavadimatti et al.
2021/0407694 A1* 12/2021  Deckert ................. G16H 15/00

OTHER PUBLICATIONS

"Catch drift outside of your infrastructure code", Retrieved from: https://web.archive.org/web/20210503110028/https://driftctl.com/, May 3, 2021, 5 Pages.
Lanzman, et al., "Terraformer", Retrieved from:https://github.com/GoogleCloudPlatform/terraformer, Apr. 19, 2021, 16 pages.
"International Search Report and Written Opinion Issued in PCT Application No. PCT/US22/029523", Mailed Date: Aug. 25, 2022, 12 Pages.

* cited by examiner

*Primary Examiner* — Tammy E Lee
(74) *Attorney, Agent, or Firm* — NICHOLSON DE VOS WEBSTER & ELLIOTT LLP

(57) ABSTRACT

Techniques for remediating drift in real cloud infrastructure from desired cloud infrastructure. In one technique, a configuration graph is generated based on first infrastructure configuration code. A deployed state of a cloud infrastructure is generated based on a data schema and a current state of the cloud infrastructure. Resources indicated in the deployed state are matched to nodes in the configuration graph. Based on differences between the resources and the nodes, the configuration graph is updated to generate an updated configuration graph. Based on the updated configuration graph, second infrastructure configuration code is generated that is different than the first infrastructure configuration code.

16 Claims, 9 Drawing Sheets

REMEDIATING DRIFT IN THE CLOUD

TECHNICAL FIELD

The present disclosure generally relates to cloud infrastructure management and, more particularly to, remediating drift of cloud configuration code.

BACKGROUND

Cloud computing is the on-demand availability of computer system resources, such as data storage ("cloud storage") and computing power, without direct active management by the user. "Cloud computing" is generally used to describe data centers available to many users over the Internet. Large clouds have functions distributed over multiple locations from central servers. A "cloud" may be limited to a single organization (referred to as an "enterprise cloud") or may be available to multiple organizations (referred to as a "public cloud").

Cloud computing relies on sharing of resources to achieve coherence and economies of scale, allows companies to avoid or minimize up-front IT infrastructure costs, allows enterprises to get their applications up and running faster (with improved manageability and less maintenance), and enables IT teams to more rapidly adjust resources to meet fluctuating and unpredictable demand, thus providing burst computing capability, i.e., high computing power at certain periods of peak demand. Factors in the growth of cloud computing include the availability of high-capacity networks, low-cost computers and storage devices, and the widespread adoption of hardware virtualization.

Infrastructure as code (IAC) software tools have been developed that allow enterprises to define and provide data center infrastructure using a declarative configuration language. An example of an open source version of such a software tool is Terraform and examples of declarative configuration languages include HashiCorp Configuration Language (HCL) and JavaScript Objection Notation (JSON).

IAC is the process of managing and provisioning computer data centers through machine-readable definition files, rather than physical hardware configuration or interactive configuration tools. The IT infrastructure managed by this process comprises both physical equipment, such as bare-metal servers, as well as virtual machines, and associated configuration resources. The ability to treat infrastructure like code and use the same tools as any other software project allows developers to rapidly deploy applications.

Using IAC software tools, such as Terraform, to manage and keep track of an enterprise's resources in the cloud has risks, drift being one of them. "Drift" happens when desired infrastructure deviates from real infrastructure. For example, an enterprise user employs a user interface provided by a cloud provider that hosts the enterprise's cloud to add a new database and load data into the new database. At this point, the deployed or "real" infrastructure of the enterprise's resources has deviated from the desired infrastructure that is reflected in the (e.g., Terraform) IAC code that describes the desired infrastructure. Another enterprise user, employing a user interface provided by an IAC software tool, may make a change to the IAC code and then apply the change to the current cloud. Because the modified IAC code does not refer to the new database, applying the modified IAC code would result in erasing the new database. And if the modified IAC code is applied in another data center or fabric, doing so will result in a cloud infrastructure that lacks the new database. Thus, resources created in the cloud might not be tracked, resulting in multiple potential issues, such as over-provisioning. As an example of over-provisioning, suppose an enterprise user creates a VMSS (virtual-machine-scale-set) with Azure Cloud for an enterprise. However, the enterprise manages one hundred subscriptions and thousands of resource groups, each of which contains potentially hundreds of resources. Having a human manually track resources and determine which resources and resource groups are no longer being used is difficult.

Remediating drift, or conforming desired infrastructure to real infrastructure, requires manual intervention by one or more human operators. When operating at scale with hundreds of thousands of cloud resources, remediation can quickly become an operational nightmare with operators having to constantly edit infrastructure code. A log of changes may be kept to track changes to the cloud provider code. However, someone with familiarity with the (e.g., Terraform) configuration code must manually go through that log and translate each change into a change of the configuration code.

If the IAC code does not accurately reflect the true or actual infrastructure, then using the IAC code to roll out new fabrics will result in fabrics that have differences compared to the true infrastructure. If a critical service in the true infrastructure is not reflected in the IAC code, then those rolled out fabrics could result in an outage.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
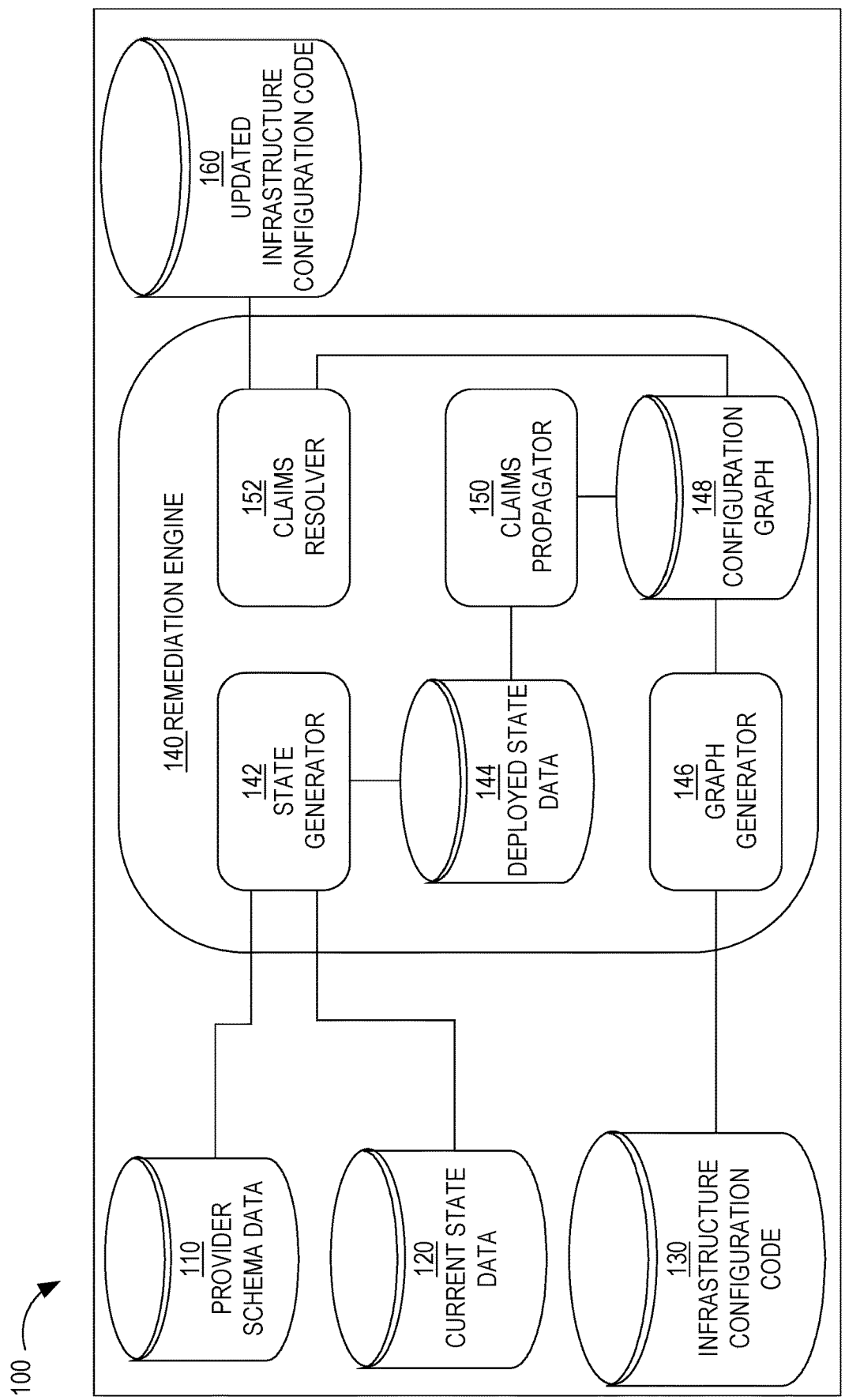
FIG. 1 is a block diagram that depicts an example system for automatically performing drift remediation, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for remediating drift in infrastructure code are provided. In one technique, a directed graph is generated based on first infrastructure code that reflects a desired cloud infrastructure for an enterprise. The directed graph comprises (1) nodes representing infrastructure items, such as modules, resources, and data sources and (2) edges connecting some of the nodes. A deployed state data of the actual cloud infrastructure is generated based on current state data and a provider schema. Once the directed graph and the deployed state data are generated, infrastructure items indicated in the deployed state data are matched to infrastructure items indicated in the directed graph. Based on differences between the two sets of infrastructure items, the directed graph is updated to generate an updated graph. Based on the updated graph, second infrastructure code is automatically generated that is different than the first infrastructure code and reflects the differences between the desired cloud infrastructure and the actual cloud infrastructure.

Embodiments improve computer-related technology by automatically remediating drift in infrastructure code. Embodiments allow drift to be fixed automatically and data center rollout to be consistent.

Example Infrastructure Configuration Code

The following is a simple example of desired infrastructure configuration code (labeled "Original Configuration Code") for an enterprise in order to illustrate drift remediation:

```
Original Configuration Code provider "azurerm" {
  subscription_id = "**************************"
  tenant_id       = "**************************"
  features { }
  skip_provider_registration = true
}
resource "azurerm_cosmosdb_account" "tfaas_db" {
  enable_automatic_failover      = true
  enable_multiple_write_locations = false
  ip_range_filter                 = ""
  is_virtual_network_filter_enabled = false
  kind                            = "GlobalDocumentDB"
  location                        = "southcentralus"
  name                            = "cosmosdb-dev-tfaas-*********"
  offer_type                      = "Standard"
  resource_group_name             = "rg-dev-tfaas-1"
  consistency_policy {
    consistency_level      = "BoundedStaleness"
    max_interval_in_seconds = 500
    max_staleness_prefix   = 100000
  }
  geo_location {
    failover_priority = 0
    location          = "southcentralus"
    prefix            = ""
  }
}
resource " azurerm_private_endpoint" "db_endpoint" {
  location            = "eastus"
  name                = "cosmosdb-dev-tfaas-*********-eastus-pe"
  resource_group_name = "rg-dev-tfaas-1"
  subnet_id           =
"/subscriptions/************************/resourceGroups/arp-lnkdprod-
eastus-vnet-
29/providers/Microsoft.Network/virtualNetworks/vnet3/subnets/subnet479842"
  private_service_connection {
    is_manual_connection = false
    name                 = "cosmosdb-dev-tfaas-*********-pe"
    private_connection_resource_id =
"/subscriptions/************************/resourceGroups/rg-dev-tfaas-
1/providers/Microsoft.DocumentDB/databaseAccounts/cosmosdb-dev-tfaas-
*********"
    request_message   = ""
    subresource_names = ["Sql"]
  }
}
resource "azurerm_private_endpoint" "db_endpoint_southcentral" {
  location            = "southcentralus"
  name                = "cosmosdb-dev-tfaas-*********-southcentralus-pe"
  resource_group_name = "rg-dev-tfaas-1"
  subnet_id           =
"/subscriptions/************************/resourceGroups/scus-ei-lid-
network-
rg/providers/Microsoft.Network/virtualNetworks/eiLidAppVnet/subnets/App4Su
bnet"
  private_service_connection {
    is_manual_connection = false
    name                 = "cosmosdb-dev-tfaas-*********-pe"
    private_connection_resource_id =
"/subscriptions/************************/resourceGroups/rg-dev-tfaas-
1/providers/Microsoft.DocumentDB/databaseAccounts/cosmosdb-dev-tfaas-
```

| Original Configuration Code |
|---|
| ```
*********"
    request_message     = ""
    subresource_names   = ["Sql"]
  }
}
``` |

Original Configuration Code is an example of Terraform IAC configuration code. (An updated version of this configuration code is provided herein entitled "Updated Configuration Code" that may have been generated using techniques described herein.) In this example, there are two workload blocks within an intended state block, which is within a scale set resource block. In this example, the cloud provider is Microsoft Azure, but other example cloud providers include Google Cloud and Amazon Web Services.

IAC configuration code (or infrastructure configuration code, or IAC for short) describes a configuration. A configuration may consist of multiple files and directories. A file containing IAC is referred to as a configuration file. A configuration informs a software tool (such as Terraform) how to manage an enterprise's infrastructure.

IAC language is built around two main syntax constructs: arguments and configuration blocks (or "blocks" for short). An argument assigns a value to a particular name, referred to as an argument name or an attribute name. A value may be a primitive value (e.g., a string value, a Boolean value, or an integer value), a reference (i.e., to another block), or a combination of any of the two, such as two primitive values joined by an operator, or an aggregation of a primitive value and a reference.

A block is a container for content and has a type. Examples of types of blocks include Resources, Local Variables, Data Sources, and Modules. A Module is a special block that acts as a container for Resources, Local Variables, and Data Sources.

Each block includes a type name that indicates the block type (e.g., "resource" for resource, "local" for local variables and "data" for data sources). A module may be remote or local. A local module has local sources and a remote module has remote sources. For example, a local module references a configuration code path in a local directory containing Terraform code, while a remote module references a downloadable directory containing Terraform code.

Each block type defines a number of labels that follow the type name. For example, the resource block type expects two labels. A particular block type may have any number of required labels, or it may require none, such as with the nested geo location block type.

After the block type name and any labels, the body of the block is delimited by the and characters. Within the block body, further arguments and blocks may be nested, creating a hierarchy of blocks and their associated arguments.

For the "tfaas_db" resource block in the example IAC above, attribute/argument names include "enable_automatic_failover," "enable_multiple_write_locations," and "ip_range_filters," while attribute/argument names of the consistency_policy block include "consistency_level" and "max_interval_in_seconds." In these examples, the values of the attribute/argument names (or "attributes" for short) are character strings. However, a value of an attribute may be an integer or reference to another block.

System Overview

FIG. 1 is a block diagram that depicts an example system 100 for automatically performing drift remediation, in an embodiment. System 100 includes a provider schema data 110, current state data 120, infrastructure as code (IAC) 130, a remediation engine 140, and updated IAC 160. Remediation engine 140 includes a state generator 142, deployed state data 144, a graph generator 146, a configuration graph 148, a claims propagator 150, and a claims resolver 152.

State generator 142 takes, as input, provider schema data 110 and current state data 120 and generates deployed state data 144 as output. Graph generator 146 takes IAC 130 as input and generates configuration graph 148 as output. Claims propagator 150 takes, as input, configuration graph 148 and deployed state data 144 and updates configuration graph 148 with one or more claims. A claim is a temporary assignment of an attribute value from deployed state data 144 to an attribute of a node in configuration graph 148. After claims propagator 150 generates all claims, some attributes of nodes in configuration graph 148 may be associated with multiple claims.

Claims resolver 152 resolves any situation where multiple claims are associated with the same node in configuration graph 148 and updates configuration graph 148 accordingly. Remediation engine 140 (or a component thereof) takes the updated version of configuration graph 148 and generates updated IAC 160 as output.

Provider Schema Data

Provider schema data 110 includes schema data that defines what attributes can and cannot be part of configuration. Provider schema data 110 is used to convert current state data 120 to an equivalent configuration code. For example, removing corresponding "'computed': 'true'" fields in provider schema data 110 from current state data 120 is part of the conversion from the current state to configuration code. Once this step is completed, the result is a full representation of everything that is deployed in real/actual infrastructure in JSON form.

Different cloud providers have different schemas. Thus, provider schema data 110 may contain multiple provider schemas.

For each instance of a provider's schema, provider schema data 110 contains field types of a resource (e.g., string, Boolean, number) and the schema of the resource (e.g., provider_schemas. registry.terraform.io/hashicorp/ azurerm. resource_schemas .azurerm_cosmosdb_account, and whether attributes of the resource cannot be part of the configuration. The following is a portion of an example provider schema:

| Provider Schema |
|---|
| ```
{
  "format_version": "0.1",
  "provider_schemas": {
    "registry.terraform.io/hashicorp/azurerm": {
      "provider": {
``` |

Provider Schema

```
        "version": 0,
        "block": {
            "attributes": {
                "auxiliary_tenant_ids": {
                    "type": [
                        "list",
                        "string"
                    ],
                    "description_kind": "plain",
                    "optional": true
                },
                "client_certificate_password": {
                    "type": "string",
                    "description": "The password associated with the Client Certificate. For use when authenticating as a Service Principal using a Client Certificate",
                    "description_kind": "plain",
                    "optional": true
                },
                "client_certificate_path": {
                    "type": "string",
                    "description": "The path to the Client Certificate associated with the Service Principal for use when authenticating as a Service Principal using a Client Certificate.",
                    "description_kind": "plain",
                    "optional": true
                },
                "client_id": {
                    "type": "string",
                    "description": "The Client ID which should be used.",
                    "description_kind": "plain",
                    "optional": true
                },
                "client_secret": {
                    'type": "string",
                    "description": "The Client Secret which should be used. For use When authenticating as a Service Principal using a Client Secret.",
                    "description_kind": "plain",
                    "optional": true
                },
                "disable_correlation_request_id": {
                    "type": "bool",
                    "description": "This will disable the x-ms-correlation-request-id header.",
                    "description_kind": "plain",
                    "optional": true
                },
                "disable_terraform_partner_id": {
                    "type": "bool",
                    "description": "This will disable the Terraform Partner ID which is used if a custom `partner_id` isn't specified.",
                    "description_kind": "plain",
                    "optional": true
                },
                "environment": {
                    "type": "string",
                    "description": "The Cloud Environment which should be used. Possible values are public, usgovernment, german, and china. Defaults to public.",
                    "description_kind": "plain",
                    "optional": true
                },
                "metadata_url": {
                    "type": "string",
                    "description": "The Metadata URL which will be used to obtain the Cloud Environment.",
                    "description_kind": "plain",
                    "optional": true
                },
                "msi_endpoint": {
                    "type": "string",
                    "description": "The path to a custom endpoint for Managed Service Identity - in most circumstances this should be detected automatically. ",
                    "description_kind": "plain",
                    "optional": true
                },
                "partner_id": {
                    "type": "string",
                    "description": "A GUID/UUID that is registered with Microsoft to facilitate partner resource usage attribution.",
                    "description_kind": "plain",
                    "optional": true
                },
                "skip_credentials_validation": {
                    "type": "bool",
                    "description": "This will cause the AzureRM Provider to skip verifying the credentials being used are valid.",
                    "description_kind": "plain",
                    "optional": true
                },
                "skip_provider_registration": {
                    "type": "bool",
                    "description": "Should the AzureRM Provider skip registering all of the Resource Providers that it supports, if they're not already registered?",
                    "description_kind": "plain",
                    "optional": true
                },
                "storage_use_azuread": {
                    "type": "bool",
                    "description": "Should the AzureRM Provider use AzureAD to access the Storage Data Plane API's?",
                    "description_kind": "plain",
                    "optional": true
                },
                "subscription_id": {
                    "type": "string",
                    "description": "The Subscription ID which should be used.",
                    "description_kind": "plain",
                    "optional": true
                },
                "tenant_id": {
                    "type": "string",
                    "description": "The Tenant ID which should be used.",
                    "description_kind": "plain",
                    "optional": true
                },
                "use_msi": {
                    "type": "bool",
                    "description": "Allowed Managed Service Identity be used for Authentication.",
                    "description_kind": "plain",
                    "optional": true
                }
            },
            "resource_schemas": {
                "azurerm_cosmosdb_account": {
                    "version": 0,
                    "block": {
                        "attributes": {
                            "connection_strings": {
                                "type": [
                                    "list",
                                    "string"
                                ],
                                "description_kind": "plain",
                                "computed": true,
                                "sensitive": true
                            },
                            "enable_automatic_failover": {
                                "type": "bool",
                                "description_kind": "plain",
                                "optional": true
                            },
                            "enable_multiple_write_locations": {
                                "type": "bool",
                                "description_kind": "plain",
                                "optional": true
                            },
                            "endpoint": {
                                "type": "string",
```

| Provider Schema |
|---|
| ```
      "description_kind": "plain",
      "computed": true
    },
    "id": {
      "type": "string",
      "description_kind": "plain",
      "optional": true,
      "computed": true
    },
    "ip_range_filter": {
      "type": "string",
      "description_kind": "plain",
      "optional": true
    },
    "is_virtual_network_filter_enabled": {
      "type": "bool",
      "description_kind": "plain",
      "optional": true
    },
    "kind": {
      "type": "string",
      "description_kind": "plain",
      "optional": true
    },
    "location": {
      "type": "string",
      "description_kind": "plain",
      "required": true
    },
    "name": {
      "type": "string",
      "description_kind": "plain",
      "required": true
    },
    "offer_type": {
      "type": "string",
      "description_kind": "plain",
      "required": true
    },
    "primary_master_key": {
      "type": "string",
      "description_kind": "plain",
      "computed": true,
      "sensitive": true
    },
    "primary_readonly_master_key": {
    "type": "string",
    "description_kind": "plain",
    "computed": true,
    "sensitive": true
    },
    "read_endpoints": {
      "type": [
        "list",
        "string"
      ],
      "description_kind": "plain",
      "computed": true
    },
    "resource_group_name": {
      "type": "string",
      "description_kind": "plain",
      "required": true
    },
    "secondary_master_key": {
      "type": "string",
      "description_kind": "plain",
      "computed": true,
      "sensitive": true
    },
    "secondary_readonly_master_key": {
      "type": "string",
      "description_kind": "plain",
      "computed": true,
      "sensitive": true
    },
    "tags": {
``` |
| ```
      "type": [
        "map",
        "string"
      ],
      "description_kind": "plain",
      "optional": true
    },
    "write_endpoints": {
      "type": [
        "list",
        "string"
      ],
      "description_kind": "plain",
      "computed": true
    }
  },
  "block_types": {
    "capabilities": {
      "nesting_mode": "set",
      "block": {
        "attributes": {
          "name": {
            "type": "string",
            "description_kind": "plain",
            "required": true
          }
        },
        "description_kind": "plain"
      }
    },
    "consistency_policy": {
      "nesting_mode": "list",
      "block": {
        "attributes": {
          "consistency_level": {
            "type": "string",
            "description_kind": "plain",
            "required": true
          },
          "max_interval_in_seconds": {
            "type": "number",
            "description_kind": "plain",
            "optional": true
          },
          "max_staleness_prefix": {
            "type": "number",
            "description_kind": "plain",
            "optional": true
          }
        },
        "description_kind": "plain"
      },
      "min_items": 1,
      "max_items": 1
    },
    "geo_location": {
      "nesting_mode": "set",
      "block": {
        "attributes": {
          "failover_priority": {
            "type": "number",
            "description_kind": "plain",
            "required": true
          },
          "id": {
            "type": "string",
            "description_kind": "plain",
            "computed": true
          },
          "location": {
            "type": "string",
            "description_kind": "plain",
            "required": true
          },
          "prefix": {
            "type": "string",
            "description_kind": "plain",
``` |

| Provider Schema |
|---|
| ``````plaintext
            "optional": true
          }
        },
        "description_kind": "plain"
      },
      "min_items": 1
    },
    "timeouts": {
      "nesting_mode": "single",
      "block": {
        "attributes": {
          "create": {
            "type": "string",
            "description_kind": "plain",
            "optional": true
          },
          "delete": {
            "type": "string",
            "description_kind": "plain",
            "optional": true
          },
          "read": {
            "type": "string",
            "description_kind": "plain",
            "optional": true
          },
          "update": {
            "type": "string",
            "description_kind": "plain",
            "optional": true
          }
        },
        "description_kind": "plain"
      }
    },
``` |

| Provider Schema |
|---|
| ``````plaintext
    "virtual_network_rule": {
      "nesting_mode": "set",
      "block": {
        "attributes": {
          "id": {
            "type": "string",
            "description_kind": "plain",
            "required": true
          },
          "ignore_missing_vnet_service_endpoint": {
            "type": "bool",
            "description_kind": "plain",
            "optional": true
          }
        },
        "description_kind": "plain"
      }
    },
    "description_kind": "plain"
  }
},
``` |

Current State Data

Current state data 120 is configuration code that reflects the current state of an enterprise's infrastructure in a format recognizable to the cloud provider that implements the enterprise's infrastructure. Thus, current state data 120 conforms to a schema of that cloud provider. As described herein, different cloud providers have different configuration code schemas.

An example of current state data 120 is as follows:

| Current State |
|---|
| ``````plaintext
{
  "format_version": "0.1",
  "terraform_version": "0.14.5",
  "values": {
    "root_module": {
      "resources": [
        {
          "address": "azurerm_cosmosdb_account.tfaas_db",
          "mode": "managed",
          "type": "azurerm_cosmosdb_account",
          "name": "tfaas_db",
          "provider_name": "registry.terraform.io/hashicorp/azurerm",
          "schema_version": 0,
          "values": {
            "capabilities": [ ],
            "connection_strings": [
              "AccountEndpoint=https://cosmosdb-dev-tfaas-
                *******documents.azure.com:443/;AccountKey=**;;",
              "AccountEndpoint=https://cosmosdb-dev-tfaas-
                *******documents.azure.com:443/;AccountKey=**;",
              "AccountEndpoint=https://cosmosdb-dev-tfaas-
                *******documents.azure.com:443/;AccountKey=**;",
              "AccountEndpoint=https://cosmosdb-dev-tfaas-
                *******documents.azure.com:443/;AccountKey=**;"
            ],
            "consistency_policy": [
              {
                "consistency_level": "BoundedStaleness",
                "max_interval_in_seconds": 300,
                "max_staleness_prefix": 100000
              }
            ],
            "enable_automatic_failover": true,
            "enable_multiple_write_locations": false,
            "endpoint": "https://cosmosdb-dev-tfaas-
              *********.documents.azure.com:443/",
            "geo_location": [
``` |

| Current State |
|---|

```
        {
            "failover_priority": 0,
            "id": "cosmosdb-dev-tfaas-*********-southcentralus",
            "location": "southcentralus",
            "prefix": ""
        },
        {
            "failover_priority": 1,
            "id": "cosmosdb-dev-tfaas-*********-eastus",
            "location": "eastus",
            "prefix": ""
        }
    ],
    "id": "/subscriptions/************************/resourceGroups/rg-
dev-tfaas-
1/providers/Microsoft.DocumentDB/databaseAccounts/cosmosdb-dev-
tfaas-*********"
    "ip_range_filter":
    "is_virtual_network_filter_enabled": false,
    "kind": "GlobalDocumentDB",
    "location": "southcentralus",
    "name": "cosmosdb-dev-tfaas-*********",
    "offer_type": "Standard",
    "primary_master_key": "****",
    "primary_readonly_master_key": "****",
    "read_endpoints": [
        "https ://cosmosdb-dev-tfaas-*********-
southcentralus.documents.azure.com:443/",
        "https ://cosmosdb-dev-tfaas-*********-
eastus.documents.azure.com:443/"
    ],
    "resource_group_name": "rg-dev-tfaas-1",
    "secondary_master_key": "*****",
    "secondary_readonly_master_key": "****",
    "tags": { },
    "timeouts": {
        "create": null,
        "delete": null,
        "read": null,
        "update": null
    },
    "virtual_network_rule": [ ],
    "write_endpoints": [
        "https ://cosmosdb-dev-tfaas-*********-
southcentralus.documents.azure.com:443/"
    ]
    }
},
{
    "address": "azurerm_private_endpoint.db_endpoint",
    "mode": "managed",
    "type": "azurerm_private_endpoint",
    "name": "db_endpoint",
    "provider_name": "registry.terraform.io/hashicorp/azurerm",
    "schema_version": 0,
    "values": {
        "custom_dns_configs": [
            {
                "fqdn": "cosmosdb-dev-tfaas-*********documents.azure.com",
                "ip_addresses": [
                    "*.*.***"
                ]
            },
            {
                "fqdn": "cosmosdb-dev-tfaas-*********-
southcentralus.documents.azure.com",
                "ip_addresses": [
                    "*.*.***"
                ]
            },
            {
                "fqdn": "cosmosdb-dev-tfaas-*********-eastus.documents.azure.com",
                "ip_addresses": [
                    "*.*.***"
                ]
            }
        ],
```

-continued

| Current State |
|---|
| "id": "/subscriptions/**********************/resourceGroups/rg-dev-tfaas-1/providers/Microsoft.Network/privateEndpoints/cosmosdb-dev-tfaas-*****-eastus-pe",<br>"location": "eastus",<br>"name": "cosmosdb-dev-tfaas-*****-eastus-pe",<br>"private_dns_zone_configs": [ ],<br>"private_dns_zone_group": [ ],<br>"private_service_connection": [<br>  {<br>    "is_manual_connection": false,<br>    "name": "cosmosdb-dev-tfaas-*****-pe",<br>    "private_connection_resource_id": "/subscriptions/********************/resourceGroups/rg-dev-tfaas-1/providers/Microsoft.DocumentDB/databaseAccounts/cosmosdb-dev-tfaas-*****",<br>    "private_ip_address": "*.*.*",<br>    "request_message":<br>    "subresource_names": [<br>      "Sql"<br>    ]<br>  }<br>],<br>"resource_group_name": "rg-dev-tfaas-1",<br>"subnet_id": "/subscriptions/**********************/resourceGroups/arp-lnkdprod-eastus-vnet-29/providers/Microsoft.Network/virtualNetworks/vnet3/subnets/subnet479842",<br>"tags": { },<br>"timeouts": {<br>  "create": null,<br>  "delete": null,<br>  "read": null,<br>  "update": null<br>  }<br>  }<br>},<br>{<br>"address": "azurerm_private_endpoint.db_endpoint_southcentral",<br>"mode": "managed",<br>"type": "azurerm_private_endpoint",<br>"name": "db_endpoint_southcentral",<br>"provider_name": "registry.terraform.io/hashicorp/azurerm",<br>"schema_version": 0,<br>"values": {<br>  "custom_dns_configs": [<br>    {<br>      "fqdn": "cosmosdb-dev-tfaas-*****.documents.azure.com",<br>      "ip_addresses": [<br>        "*.*.*"<br>      ]<br>    },<br>    {<br>      "fqdn": "cosmosdb-dev-tfaas-*******-southcentralus.documents.azure.com",<br>      "ip_addresses": [<br>        "*.*.*"<br>      ]<br>    },<br>    {<br>      "fqdn": "cosmosdb-dev-tfaas-*******-eastus.documents.azure.com",<br>      "ip_addresses": [<br>        "*.*.*"<br>      ]<br>    }<br>  ],<br>"id": "/subscriptions/**********************/resourceGroups/rg-dev-tfaas-1/providers/Microsoft.Network/privateEndpoints/cosmosdb-dev-tfaas-*****-southcentralus-pe",<br>"location": "southcentralus",<br>"name": "cosmosdb-dev-tfaas-*****-southcentralus-pe",<br>"private_dns_zone_configs": [ ],<br>"private_dns_zone_group": [ ],<br>"private_service_connection": [<br>  {<br>    "is_manual_connection": false,<br>    "name": "cosmosdb-dev-tfaas-*****-pe",<br>    "private_connection_resource_id": "/subscriptions/********************** |

| Current State |
|---|
| ******/resourceGroups/rg_dev_tfaas-<br>1/providers/Microsoft.DocumentDB/databaseAccounts/cosmosdb-dev-<br>tfaas-*****",<br>     "private_ip_address": "*.*.*",<br>     "request_message":<br>     "subresource_names": [<br>       "Sql"<br>     ]<br>    }<br>  ],<br>  "resource_group_name": "rg-dev-tfaas-1",<br>  "subnet_id": "/subscriptions/************************/resourceGrou<br>ps/scus-ei-lid-network-<br>rg/providers/Microsoft.Network/virtualNetworks/eiLidAppVnet/subnets/A<br>pp4Subnet",<br>  "tags": { },<br>  "timeouts": {<br>    "create": null,<br>    "delete": null,<br>    "read": null,<br>    "update": null<br>  }<br>  }<br>  }<br>  ]<br>  }<br>  }<br>} |

Because resources can be grouped by containers called modules, current state data 120 organizes resources by modules in a certain format, such as JSON.

Current state data 120 may comprise multiple current states, each describing the current state of different cloud infrastructure, which may or may not be of a different enterprise. Current state data of a cloud infrastructure may indicate the provider schema to which the current state data conforms. This information assists state generator 142 in identifying the correct provider schema data given the current state data.

State Generation

In order to generate updated IAC 160, remediation engine 140 need to know the state of the deployed infrastructure. State generator 142 generates this state, referred to herein as deployed state data 144. State generator 142 takes two sets of data as inputs in order to generate deployed state data 144: provider schema data 110 and current state data 120. An example of deployed state data 144 is as follows:

```
API server listening at: 127.0.0.1:4961
& {Modules:map[:0xc00090b340]}
container
<*golang.linkedin.com/ligo-terraform-
dsl/terraformdsl/state.Container>(0xc00059ee68)
<golang.linkedin.com/ligo-terraform-dsl/terraformdsl/state.Container>
Modules: <map[string]*golang.linkedin.com/ligo-terraform-
dsl/terraformdsl/state.Module> (length: 1)
"": <*golang.linkedin.com/ligo-terraform-
dsl/terraformdsl/state.Module>(0xc00090b340)
<golang.linkedin.com/ligo-terraform-dsl/terraformdsl/state.Module>
Addr: nil <github.com/hashicorp/terraform/addrs.ModuleInstance>
Resources: <map[string]*golang.linkedin.com/ligo-terraform-
dsl/terraformdsl/state.Resource> (length: 3)
"azurerm_cosmosdb_account.tfaas_db": <*golang.linkedin.com/ligo-terraform-
dsl/terraformdsl/state.Resource>(0xc0001e8000)
<golang.linkedin.com/ligo-terraform-dsl/terraformdsl/state.Resource>
Addr: <github.com/hashicorp/terraform/addrs.AbsResource>
targetable: <github.com/hashicorp/terraform/addrs.targetable>
Module: nil <github.com/hashicorp/terraform/addrs.ModuleInstance>
Resource: <github.com/hashicorp/terraform/addrs.Resource>
referenceable: <github.com/hashicorp/terraform/addrs.referenceable>
Mode: ManagedResourceMode (77)
Type: "azurerm_cosmosdb_account"
Name: "tfaas_db"
ProviderName: "registry.terraform.io/hashicorp/azurerm"
DependsOn: nil <[ ]github.com/hashicorp/hcl/v2.Traversal>
Instances:
<map[github.com/hashicorp/terraform/addrs.InstanceKey]*golang.linkedin.com/li
go-terraform-dsl/terraformdsl/state.ResourceInstance> (length: 1)
nil <github.com/hashicorp/terraform/addrs.InstanceKey>:
```

```
<*golang.linkedin.com/ligo-terraform-
dsl/terraformdsl/state.ResourceInstance>(0xc0008f77a0)
<golang.linkedin.com/ligo-terraform-dsl/terraformdsl/state.ResourceInstance>
Block: <golang.linkedin.com/ligo-terraform-dsl/terraformdsl/state.Block>
Attributes: <map[string]*golang.linkedin.com/ligo-terraform-
dsl/terraformdsl/state.Attribute> (length: 19)
"read_endpoints": <*golang.linkedin.com/ligo-terraform-
dsl/terraformdsl/state.Attribute>(0xc000026180)
<golang.linkedin.com/ligo-terraform-dsl/terraformdsl/state.Attribute>
Type: <github.com/zclconf/go-cty/cty.Type>
Description: ""
DescriptionKind: "plain"
Required: false
Optional: false
Computed: true
Sensitive: false
Deprecated: false
Value: <github.com/zclconf/go-cty/cty.Value>
"enable_multiple_write_locations": <*golang.linkedin.com/ligo-terraform-
dsl/terraformdsl/state.Attribute>(0xc0000263c0)
"is_virtual_network_filter_enabled": <*golang.linkedin.com/ligo-terraform-
dsl/terraformdsl/state.Attribute>(0xc0000264e0)
"location": <*golang.linkedin.com/ligo-terraform-
dsl/terraformdsl/state.Attribute>(0xc000026540)
"secondary_readonly_master_key": <*golang.linkedin.com/ligo-terraform-
dsl/terraformdsl/state.Attribute>(0xc0000266c0)
"connection_strings": <*golang.linkedin.com/ligo-terraform-
dsl/terraformdsl/state.Attribute>(0xc000026060)
"kind": <*golang.linkedin.com/ligo-terraform-
dsl/terraformdsl/state.Attribute>(0xc0000260c0)
"offer_type": <*golang.linkedin.com/ligo-terraform-
dsl/terraformdsl/state.Attribute>(0xc000026120)
"write_endpoints": <*golang.linkedin.com/ligo-terraform-
dsl/terraformdsl/state.Attribute>(0xc0000261e0)
"endpoint": <*golang.linkedin.com/ligo-terraform-
dsl/terraformdsl/state.Attribute>(0xc000026420)
"name": <*golang.linkedin.com/ligo-terraform-
dsl/terraformdsl/state.Attribute>(0xc0000265a0)
"secondary_master_key": <*golang.linkedin.com/ligo-terraform-
dsl/terraformdsl/state.Attribute>(0xc000026600)
"tags": <*golang.linkedin.com/ligo-terraform-
dsl/terraformdsl/state.Attribute>(0xc000026720)
"ip_range_filter": <*golang.linkedin.com/ligo-terraform-
dsl/terraformdsl/state.Attribute>(0xc000026240)
"primary_master_key": <*golang.linkedin.com/ligo-terraform-
dsl/terraformdsl/state.Attribute>(0xc0000262a0)
"primary_readonly_master_key": <*golang.linkedin.com/ligo-terraform-
dsl/terraformdsl/state.Attribute>(0xc000026300)
"enable_automatic_failover": <*golang.linkedin.com/ligo-terraform-
dsl/terraformdsl/state.Attribute>(0xc000026360)
"id": <*golang.linkedin.com/ligo-terraform-
dsl/terraformdsl/state.Attribute>(0xc000026480)
"resource_group_name": <*golang.linkedin.com/ligo-terraform-
dsl/terraformdsl/state.Attribute>(0xc000026660)
BlockTypes: <map[string]*golang.linkedin.com/ligo-terraform-
dsl/terraformdsl/state.NestedBlock> (length: 5)
"geo_location": <*golang.linkedin.com/ligo-terraform-
dsl/terraformdsl/state.NestedBlock>(0xc00090b480)
"timeouts": <*golang.linkedin.com/ligo-terraform-
dsl/terraformdsl/state.NestedBlock>(0xc00090b4c0)
"virtual_network_rule": <*golang.linkedin.com/ligo-terraform-
dsl/terraformdsl/state.NestedBlock>(0xc00090b500)
"capabilities": <*golang.linkedin.com/ligo-terraform-
dsl/terraformdsl/state.NestedBlock>(0xc00090b540)
"consistency_policy": <*golang.linkedin.com/ligo-terraform-
dsl/terraformdsl/state.NestedBlock>(0xc00090b580)
Description: ""
Deprecated: false
"azurerm_private_endpoint.db_endpoint": <*golang.linkedin.com/ligo-terraform-
dsl/terraformdsl/state.Resource>(0xc0001e8070)
<golang.linkedin.com/ligo-terraform-dsl/terraformdsl/state.Resource>
Addr: <github.com/hashicorp/terraform/addrs.AbsResource>
targetable: <github.com/hashicorp/terraform/addrs.targetable>
Module: nil <github.com/hashicorp/terraform/addrs.ModuleInstance>
Re source: <github.com/hashicorp/terraform/addrs.Resource>
referenceable: <github.com/hashicorp/terraform/addrs.referenceable>
Mode: ManagedResourceMode (77)
Type: "azurerm_private_endpoint"
Name: "db_endpoint"
```

```
ProviderName: "registry.terraform.io/hashicorp/azurerm"
DependsOn: nil <[ ]github.com/hashicorp/hcl/v2.Traversal>
Instances:
<map[github.com/hashicorp/terraform/addrs.InstanceKey]*golang.linkedin.com/li
go-terraform-dsl/terraformdsl/state.ResourceInstance> (length: 1)
nil <github.com/hashicorp/terraform/addrs.InstanceKey>:
<*golang.linkedin.com/ligo-terraform-
dsl/terraformdsl/state.ResourceInstance>(0xc0008f7b90)
<golang.linkedin.com/ligo-terraform-dsl/terraformdsl/state.ResourceInstance>
Block: <golang.linkedin.com/ligo-terraform-dsl/terraformdsl/state.Block>
Attributes: <map[string]*golang.linkedin.com/ligo-terraform-
dsl/terraformdsl/state.Attribute> (length: 8)
"name": <*golang.linkedin.com/ligo-terraform-
dsl/terraformdsl/state.Attribute>(0xc000026d20)
"private_dns_zone_configs": <*golang.linkedin.com/ligo-terraform-
dsl/terraformdsl/state.Attribute>(0xc000026d80)
"resource_group_name": <*golang.linkedin.com/ligo-terraform-
dsl/terraformdsl/state.Attribute>(0xc000026de0)
"subnet_id": <*golang.linkedin.com/ligo-terraform-
dsl/terraformdsl/state.Attribute>(0xc000026e40)
"tags": <*golang.linkedin.com/ligo-terraform-
dsl/terraformdsl/state.Attribute>(0xc000026ea0)
"custom_dns configs": <*golang.linkedin.com/ligo-terraform-
dsl/terraformdsl/state.Attribute>(0xc000026f00)
"id": <*golang.linkedin.com/ligo-terraform-
dsl/terraformdsl/state.Attribute>(0xc000026f60)
"location": <*golang.linkedin.com/ligo-terraform-
dsl/terraformdsl/state.Attribute>(0xc000026fc0)
BlockTypes: <map[string]*golang.linkedin.com/ligo-terraform-
dsl/terraformdsl/state.NestedBlock> (length: 3)
"private_dns_zone_group": <*golang.linkedin.com/ligo-terraform-
dsl/terraformdsl/state.NestedBlock>(0xc00090b600)
"private_service_connection": <*golang.linkedin.com/ligo-terraform-
dsl/terraformdsl/state.NestedBlock>(0xc00090b640)
"timeouts": <*golang.linkedin.com/ligo-terraform-
dsl/terraformdsl/state.NestedBlock>(0xc00090b680)
Description: ""
Deprecated: false
"azurerm_private_endpoint.db_endpoint_southcentral":
<*golang.linkedin.com/ligo-terraform-
dsl/terraformdsl/state.Resource>(0xc0001e80e0)
<golang.linkedin.com/ligo-terraform-dsl/terraformdsl/state.Resource>
Addr: <github.com/hashicorp/terraform/addrs.AbsResource>
targetable: <github.com/hashicorp/terraform/addrs.targetable>
Module: nil <github.com/hashicorp/terraform/addrs.ModuleInstance>
Resource: <github.com/hashicorp/terraform/addrs.Resource>
referenceable: <github.com/hashicorp/terraform/addrs.referenceable>
Mode: ManagedResourceMode (77)
Type: "azurerm_private_endpoint"
Name: "db_endpoint_southcentral"
ProviderName: "registry.terraform.io/hashicorp/azurerm"
DependsOn: nil <[ ]github.com/hashicorp/hcl/v2.Traversal>
Instances:
<map[github.com/hashicorp/terraform/addrs.InstanceKey]*golang.linkedin.com/li
go-terraform-dsl/terraformdsl/state.ResourceInstance> (length: 1)
ChildModules: nil <map[string]*golang.linkedin.com/ligo-terraform-
dsl/terraformdsl/state.Module>
InputValues: nil <map[string]*golang.linkedin.com/ligo-terraform-
dsl/terraformdsl/state.InputValue>
OutputValues: nil <map[string]*golang.linkedin.com/ligo-terraform-
dsl/terraformdsl/state.OutputValue>
```

With information from provider schema data 110 (such as field type and structure), state generator 142 generates equivalent data structures from current state data 120 using a statically typed language, such as Golang.

Because resources can be grouped by modules, state generator 142 groups resources by module within a data structure (e.g., Golang struct) so that every single resource in the deployed state data in 144 can be properly mapped to a globally unique resource identifier in the IAC. This identifier maps to the parent module address plus the resource address per resource (e.g. module.parent1.module.parent2.azurerm_cosmosdb_account.some_db), allowing for the matching resource block in the IAC to serve as the starting evaluation point.

The data structures (e.g., Golang structs) may be viewed as three layers of nodes: a (1) top-level container node that contains several (2) module nodes, which contain (3) resource nodes.

Graph Generation

Graph generator 146 generates configuration graph 148, which is a graph representation of IAC 130. A purpose of configuration graph 148 is so that claims propagator 150 can traverse the graph and determine where configuration code edits should be made. Current IAC evaluators, such as Terraform, do not provide a way to propagate state information backwards to the source (i.e., from the deployed state to IAC).

Configuration graph 148 comprises nodes and edges. A node represents a block in IAC 130. A node may one of multiple types, each corresponding to one of the block types in the configuration code language (e.g., HCL or JSON). Thus, examples of node types include a module node, a resource node, a data node, and a local node. A module node represents a module or container of child resources, examples of which include a resource, a data source, and a local variable. Thus, a module node may "contain" or otherwise be associated with one or more resource nodes, one or more data nodes, and/or one or more local nodes. A module node is also associated with (1) an input node representing inputs to the corresponding module and (2) an output node representing an output of the corresponding module.

Configuration graph 148 includes a module node as a root node. Each other module node in configuration graph 148 is a child node of another module node and has an edge to its parent module node.

Some nodes in connection graph 148 have edges connecting them. A first node in configuration graph 148 has a directed edge pointing to a second node if the second node references the first node. Each edge corresponds to a different attribute.

Example Configuration Graph

Figure 2:
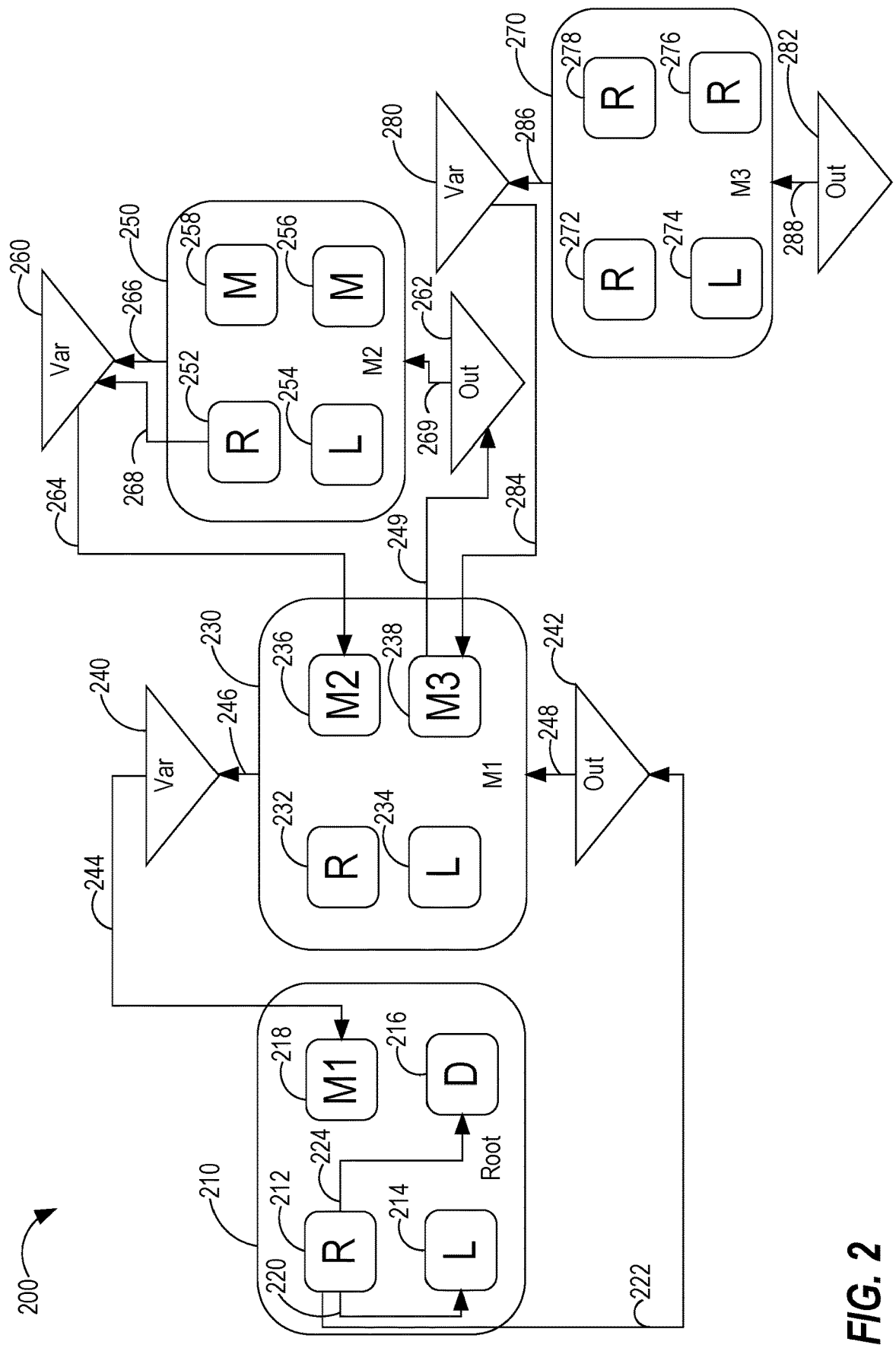
FIG. 2 is a block diagram that depicts an example configuration graph that is generated based on an IAC, in an embodiment.

FIG. 2 is a block diagram that depicts an example configuration graph 200 that is generated based on an IAC, in an embodiment. Configuration graph 200 is an example of configuration graph 148 and may have been generated by graph generator 146.

Configuration graph 200 includes a root node 210, a child module (M1) node 230, a child module (M2) node 250, and a remote module (M3) node 270. Root node 210 comprises a resource node 212, a local node 214, a data source node 216, and a module node 218.

M1 node 230 comprises a resource node 232, a local node 234, a module node 236, and a module node 238. M1 node 230 is also associated with an M1 input node 240 and an M1 output node 242. Input nodes and output nodes correspond to single block attributes and, respectively, to input variables and output variables. Examples of input variables from an IAC are the following:

```
variable "uss_azure_url" {
    description = "USS Azure URL"
    default = "https://lb-uss-azure.lit-zeus-1.linkedin.com: 10957"
}
variable "uss_azure_debug" {
    description = "USS Azure debug setting"
    default = true
}
variable "fabric" {
    description = "Fabric where the application is deployed."
}
```

Examples of output variables from an IAC are the following:

```
output "tfaas-resource-group-name" {
    value = azurerm_resource_group.tfaas.name
    description = "Name of the resource group where all the resources are created"
}
output "tfaas-kms-root" {
    value = module.tfaas-kms-root.name
}
```

```
output "cosmos-account-name" {
    value = module.tfaas-cosmosdb.account_name
    description = "Name of the cosmos db account"
}
```

M2 node 250 comprises a resource node 252, a local node 254, a module node 256, and a module node 258. M2 node 250 is also associated with an M2 input node 260 and an M2 output node 262.

M3 node 270 comprises a resource node 272, a local node 274, a resource node 276, and a resource node 278. M3 node 270 is also associated with an M3 input node 280 and an M3 output node 282.

Configuration graph 200 also has a number of edges. Edge 220 indicates that resource node 212 is referenced by local node 214, edge 222 indicates that resource node 212 is also referenced by output node 242, and edge 224 indicates that resource node 212 is also referenced by data source node 216.

Similarly, edge 244 indicates that input node 240 is referenced by module node 218, edge 246 indicates that M1 node 230 is referenced by M1 input node 240, edge 248 indicates that output node 242 is referenced by M1 node 230, and edge 249 indicates that module node 238 is referenced by M2 output node 262.

Similarly, edge 264 indicates that module node 236 is referenced by M2 input node 260, edge 266 indicates that M2 input node 260 is referenced by M2 node 250, edge 268 indicates that M2 input node 260 is also referenced by resource node 252, and edge 269 indicates that M2 node 250 is referenced by M2 output node 262.

Similarly, edge 284 indicates that module node 238 is referenced by M3 input node 280, edge 286 indicates that M3 input node 268 is referenced by M3 node 270, and edge 288 indicates that M3 node 270 is referenced by M3 output node 282.

With configuration graph 200 (or configuration graph 148), state propagation across modules, resources, and expressions is made possible. Configuration graph 200 allows for the translation from (a) evaluated resource values of tracked cloud instances to (2) code edits in (e.g., Terraform) configuration code. Claims propagation and claims resolution details a methodology through which evaluated resource values of tracked cloud instances are mapped to configuration code edits. After claims propagation, a single attribute of a node in configuration graph 200 may be associated with multiple claims. Claims resolution for that node is the process of selecting one of those claims, as described in more detail herein.

Claims Propagator

Claims propagator 150 takes configuration graph 148 and deployed state data 144 as input and updates configuration graph 148 with one or more claims. A claim is a proposed edit, or a temporary assignment of an attribute value from deployed state data 144 to an attribute of a node in configuration graph 148. After claims propagator 150 generates all claims, some attributes of nodes in configuration graph 148 may be associated with multiple claims. A purpose of claim propagation is to propogate any attribute value (from the deployed state) that differs from what the resource configuration specifies (or cannot be determined) as far up configuration graph 148 as possible. This is because IAC (e.g., Terraform code) is structured in terms of modules and, during standard evaluation of Terraform code, user-configurable values are at the source (or at or near the root) of configuration graph 148. As a specific example, inputs to IAC 130 are defined in 'tfvars' or 'tfvars.json' files and the user may define multiple modules (or file system directories) containing multiple nodes (terraform configuration files). Thus, during the drift remediation phase, it is important to "de-evaluate" or make sure any values which have deviated from the IAC are propagated, whenever possible, closer to where 'tfvars' file are defined or as upward toward the parent module when possible. This path of propagation is determined based on configuration graph 148. Enterprise users intend to set configurable inputs as close to where tfvars files are defined as possible. A policy is to propagate an attribute value (from the deployed state) based on whether the attribute value (in the matching node in configuration graph 148) is a reference to another node's attribute or is a primitive value itself. A claim pertaining to a reference is always propagated (since the node that is pointed to by the reference is closer to the user input), while a primitive value is not propagated (since there is no clear higher reference). For example, if M3 node 270 is a matching node in configuration graph 200 (i.e., it matches a selected resource from deployed state data 144) and an attribute value of a particular attribute in M3 node 270 is a reference, then edge 286 is followed to input variable 280, and then edge 284 is followed to module node 238. If the module node 238 includes the particular attribute and its value is a primitive value, then a claim is made on the particular attribute of module node 238. If the particular attribute's value is instead a reference, then edges 249 and 269 are followed to M2 node 250 and the primitive value/reference check is made again.

Figure 3A:
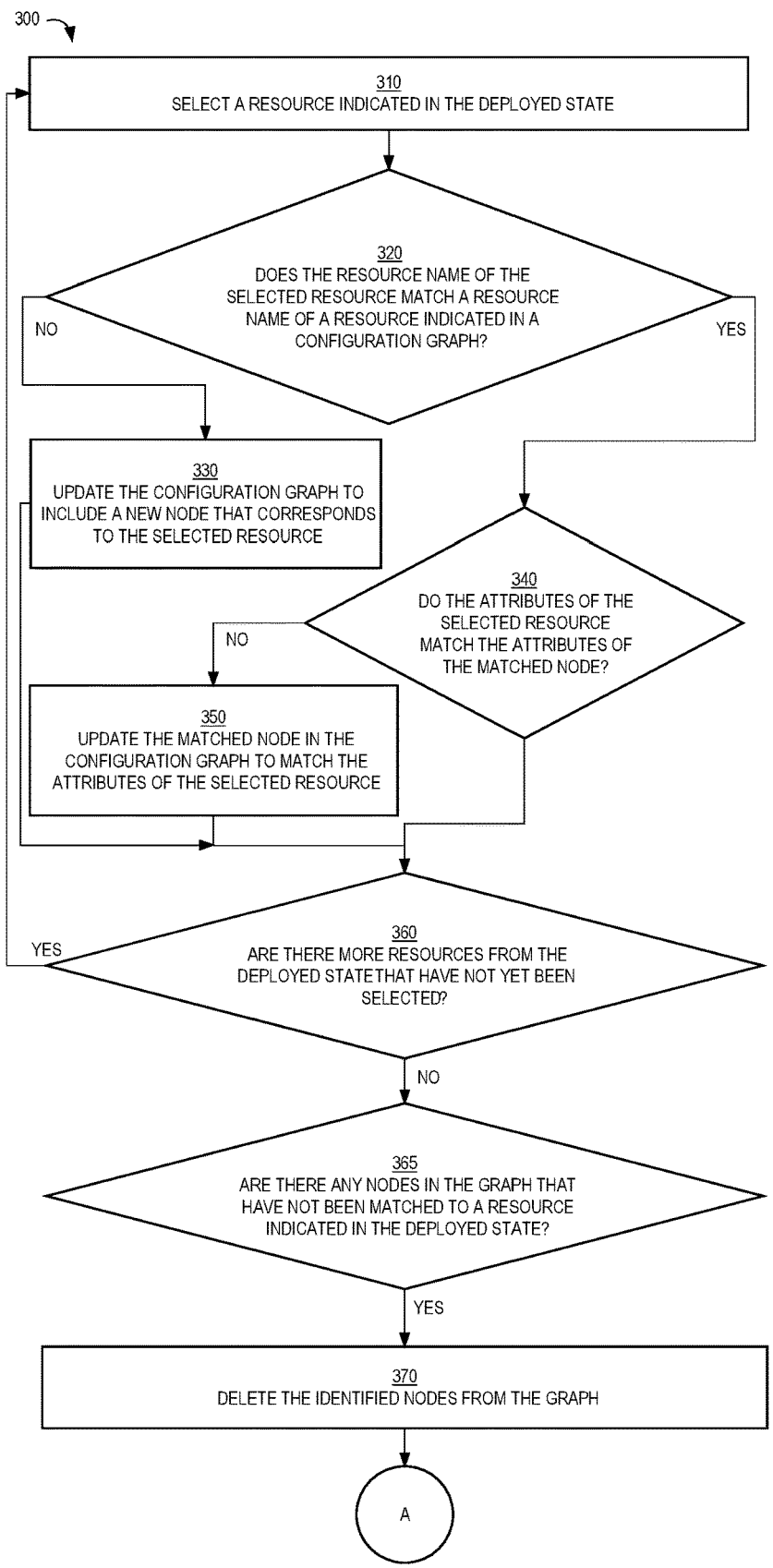
FIGS. 3A-3B is a flow diagram that depicts an example process for propagating claims in a configuration graph, in an embodiment.
Figure 3B:
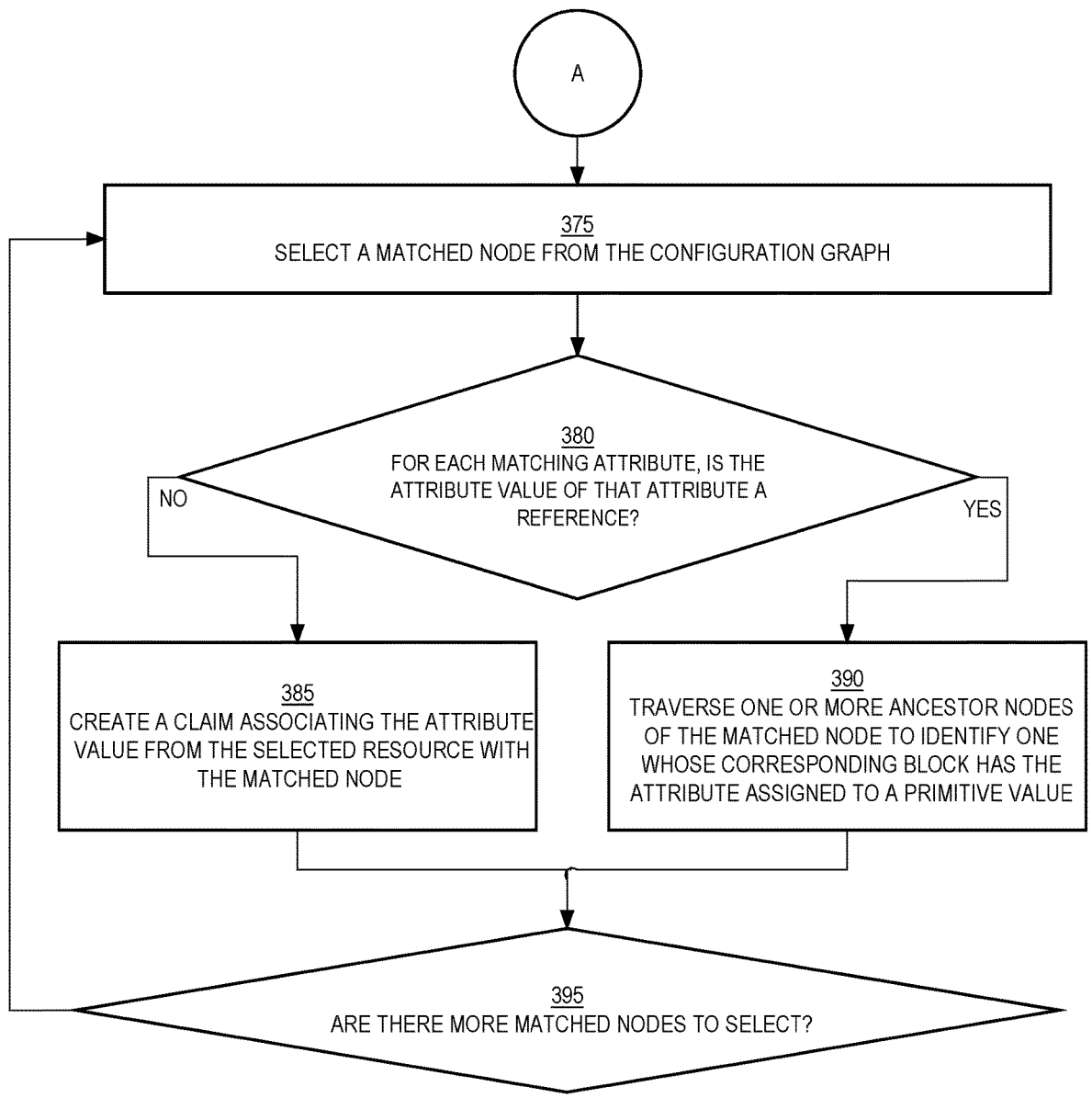

FIGS. 3A-3B is a flow diagram that depicts an example process 300 for propagating claims in a configuration graph, in an embodiment. Process 300 may be performed by claims propagator 150 and/or other components of remediation engine 140.

At block 310, a resource indicated in deployed state data 144 is selected. The selection in block 310 may be random or may be performed by selecting resources in a particular order, such as selecting the first resource indicated in deployed state data 144 that has not already been selected.

At block 320, it is determined whether a resource name of the selected resource matches a resource name/identifier (also referred to as a "resource address") of a resource indicated in configuration graph 148. If not, then process 300 proceeds to block 330. (In this case, it is presumed that the selected resource is new or was added after IAC 130 was created.) Otherwise, process 300 proceeds to block 340.

Block 320 may involve comparing the resource name of the selected resource to each resource name indicated in each node of configuration graph 148 until a match is found. The search for a matching node in configuration graph 148 may proceed until all nodes (of configuration graph 148) that have not already been matched have been considered. Once a matching node is found, the search of configuration graph 148 based on the selected resource ends. A matching node will be a leaf node in configuration graph 148.

The order in which the nodes of configuration graph 148 are searched in block 320 may be random or may start with the root node, or the highest level node (in configuration graph 148) that has not yet been matched and then proceed to lower level nodes.

At block 330, configuration graph 148 is updated to include a new node that corresponds to the selected resource. The new node includes attribute names and values indicated in the selected resource from deployed state data 144. A parent resource of the selected resource is determined and matched to a node in configuration graph 148. The new node becomes a child node of that node. Process 300 proceeds to block 360.

At block 340, it is determined whether a first set of attributes of the selected resource match a second set of attributes of the matched node in configuration graph 148. For example, the first set of attributes may be more or less than the second set of attributes. As another example, one of the attributes in the first set of attributes might not exist in the second set of attributes, and/or vice versa. If the two sets of attributes do not match, then process 300 proceeds to block 350; otherwise, process 300 proceeds to block 360. Block 340 may also involve marking the matched node to indicate that there was a match, or otherwise storing data that identifies the matched node as being part of a match. This data is used later in block 370 to determine whether there were any nodes that did not experience any match to a resource in deployed state data 144.

At block 350, the matched node in configuration graph 148 is updated to include the first set of attributes. For example, one of the attributes in the second set of attributes is deleted and/or an attribute is added to the second set of attributes. Process 300 then proceeds to block 360.

At block 360, it is determined whether there are any more resources that have not yet been selected from deployed state data 144. If so, then process 300 returns to block 310. Otherwise, process 300 proceeds to block 365, which begins a trimming phase that involves blocks 365 and 370.

At block 365, it is determined whether there are any nodes in configuration graph 148 that have not been matched to a resource from deployed state data 144. If so, then process 300 proceeds to block 370; otherwise, process 300 proceeds to block 380. Block 365 may involve checking each node in configuration graph 148 to determine whether it is associated with match data that indicates that a resource from deployed state data 144 matched to that node.

At block 370, the identified nodes in block 365 are deleted from configuration graph 148. After the trimming phase, process 300 enters the claim generation phase, comprising blocks 375-395.

At block 375, a matched node in configuration graph 148 is selected.

At block 380, for each attribute in the matched node that corresponds to a resource from deployed state, it is determined whether the attribute value of that attribute (of the matched node) is a reference or a primitive value. Examples of primitive values include a specific string, a specific integer, or a specific Boolean value. In fact, in JSON, the only attribute values are Strings, Booleans, and Integers. The matched node in configuration graph 148 indicates whether the attribute is a reference or a primitive value. If the attribute is a primitive value, then process 300 proceeds to block 385; otherwise, process 300 proceeds to block 390.

At block 385, a claim of the attribute value from the selected resource is made with the matched node. In other words, the attribute value from the selected resource is associated with (at least temporarily) with the matched node. A claim may also comprise an identifier of the matched node.

At block 390, one or more ancestor nodes of the matched node in configuration graph 148 are traversed to identify an ancestor node whose corresponding block has the attribute and that attribute is assigned a primitive value. Block 390 results in creating a claim to that ancestor node. In other words, the attribute value from the selected resource is associated with that ancestor node. The claim comprises an identifier of the matched node, an identifier of the ancestor node, and a path identifying any nodes that were traversed between the matched node and the ancestor node. Block 390 is explained in more detail in FIG. 4.

At block 395, it is determined whether there any matched nodes in (configuration graph 148) that have not yet been selected in block 375. If so, then process 300 returns to block 375; otherwise, process 300 ends.

Traversing the Configuration Graph

Figure 4:
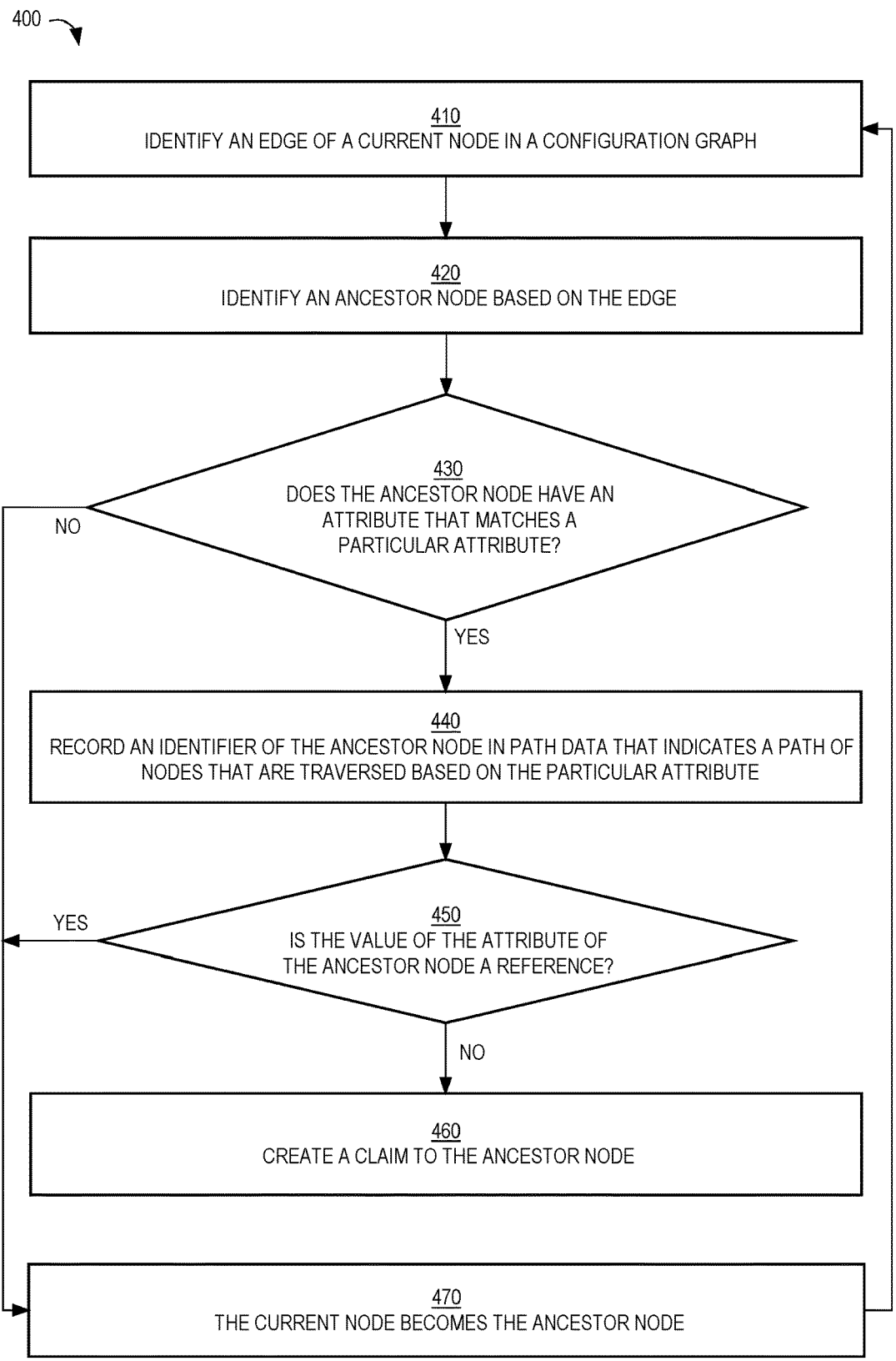
FIG. 4 is a flow diagram that depicts an example process for traversing a configuration graph, in an embodiment.

FIG. 4 is a flow diagram that depicts an example process 400 for traversing configuration graph 148 from a matched node based on a particular attribute that is assigned a reference in the IAC block that corresponds to the matched node, in an embodiment. "Traversing" refers to following one or more edges and nodes in configuration graph 148 beginning at a matched node that has been identified based on a selected resource indicated in deployed state data 144. The matched node is referred to as the "source" with respect to the particular attribute. The selected resource is assigned a value for the particular attribute. As noted herein, the purpose of traversing is to identify the highest level node to make a primitive value edit, which involves (1) assigning a primitive value of an attribute of a selected resource to (2) the attribute in a node indicated in configuration graph 148, where the node is either the matched node or a node that is higher up the configuration graph 148 (i.e., toward the root node) than the matched node. Making primitive value edits as high in the configuration graph 148 as possible makes maintaining IAC 130/160 more manageable because end-users and automated programs expect to provide inputs for these attributes where those attributes are likely to be defined, i.e., as close to the root node as possible.

At block 410, an edge of a current node in the configuration graph 148 is identified. In the first iteration of block 410, the current node is the source, or matched node. In subsequent iterations of block 410, the current node is an ancestor node of the source.

The edge points from the current node to another node. Such an edge is referred to as an outgoing edge with respect to the node of block 410. In some cases, a node has multiple outgoing edges. For example, resource node 212 has multiple outgoing edges. Therefore, block 410 may involve selecting one of multiple outgoing edges.

At block 420, an ancestor node is identified based on the edge identified in block 410. If the ancestor node is a module input node or a module output node, then an outgoing edge from that node is followed until a non-input/non-output ancestor node is identified.

At block 430, it is determined whether the ancestor node has an attribute that matches the particular attribute (in question). If so, then process 400 proceeds to block 440. Otherwise, process 400 proceeds to block 470.

At block 440, an identifier of the ancestor node is recorded in path data that indicates the path of nodes (beginning with the source) that are traversed based on the particular attribute and a corresponding selected resource from the deployed state that triggered the present traversal.

At block 450, it is determined whether the value of attribute of the ancestor node is a reference. If not, then process 400 proceeds to block 460. Otherwise, process 400 proceeds to block 470, where the ancestor node becomes the current node.

At block 460, a claim is created to the ancestor node. In other words, the attribute value from the selected resource is temporarily associated with that ancestor node. The claim also indicates the name of the attribute, an identifier of the source, an identifier of the ancestor node, and the path data. The ancestor node is referred to as the "sink."

For example, a selected resource matches a configuration node that corresponds to resource node 252. If the resource of resource node 252 includes an attribute that is assigned to a reference, then edge 268 is followed to M2 input node 260 and (as long as M2 input node 260 does not have a definition for the attribute) edge 266 is followed to module node 236. If module node 236 includes the attribute, then it is determined whether the attribute is assigned a reference or a primitive value. If the former, then the edges are followed and this traversal process is repeated; if the latter, then module node 236 is temporarily associated with the corresponding attribute value from the selected resource.

At block 470, the current node becomes the ancestor node. Then, when process 400 returns to block 410, an edge of the ancestor node will be identified.

Claims Resolution

After each resource in deployed state data 144 is analyzed, one or more nodes in configuration graph 148 may include multiple claims pertaining to the same attribute. For example, module node 218 may include multiple claims, each corresponding to the same attribute. As a specific example, the configuration block in IAC 130 may include an attribute whose name is "count" and different claims pertaining to a value for the count attribute.

Claim resolution begins with leaf nodes (e.g., resource nodes) and propagate upward toward the root module node. Claims resolver 152 selects a node in configuration graph 148 and determines whether the node is associated with multiple claims pertaining to the same attribute. If so, then claims resolver 152 considers one or more factors to select one of the multiple claims for applying to the attribute of the node. "Applying a claim to a node" involves updating the node to assign the value of the claim to the corresponding attribute of the node. If there are multiple factors, then the factors may be hierarchical or prioritized such that the factors are considered in order from highest priority to lowest priority.

A principle of claims resolution is determining which claim is least changeable. For example, a first factor is whether the claim is on the source. In other words, the source and the sink of the claim are the same node. Thus, the claim cannot be propagated upward, or further up configuration graph 148. This first factor may be the highest priority factor and, therefore, may be applied first. Any other claims on the attribute are propagated backwards/downwards toward the sources of those claim(s).

A second factor is whether the claim is on a computed attribute. A computed attribute is one where the value is computed server-side rather than being provided as inputs in IAC 130. If a claim's value matches the computed attribute's value, then that claim takes the next highest precedence. Otherwise, the claim is invalidated and propagated backward since computed fields are generally read-only.

A third factor is whether the claim is on an attribute that depends on a remote source. A remote source is a source that is not configured in IAC 130. For example, the attribute may be a reference to a source that is elsewhere in the cloud or a repository outside the infrastructure. Such a claim is removed (or disassociated) from the attribute and path data of the claim is used to propagate backward (or down towards a leaf node). Thus, the path data is used to identify a preceding node in the claim's path and the claim is associated with that preceding node.

If there are still multiple claims associated with an attribute of a node, then a fourth factor for selecting one of the multiple claims is determining whether any of the multiple claims has a path that is a subpath of a path of another one of the multiple claims. The claim with the subpath will always have precedence; otherwise, the claim with the subpath will not be able to make a reference to a node.

If there are still multiple claims associated with a node, then a fifth factor is selecting the claim that has the shortest path. For example, if (1) claim A has a path whose length is three nodes from the claim's sink to the source of claim A and (2) claim B has a path whose length is five nodes from the claim's sink to the source of claim B, then claim A is applied to the current node. If, after all these factors are considered, there are still multiple claims associated with a node, then one of the claims is randomly selected and the other claim(s) is/are propagated backward down their respective paths.

After applying one or more of these factors to a node with multiple claims, the node will have a single claim. That single claim is applied to the node. All other claims to that node propagate down one node based on their respective paths. The respective paths may be the same or different. For example, node X is a sink for claims A, B, and C. After applying the one or more factors, claim A is applied to node X. Claim B is then assigned to node Y and Claim C is assigned to node Z, where nodes Y and Z are child nodes of node X. Node Y is in the path of claim B and node Z is in the path of claim C.

Figure 5A:
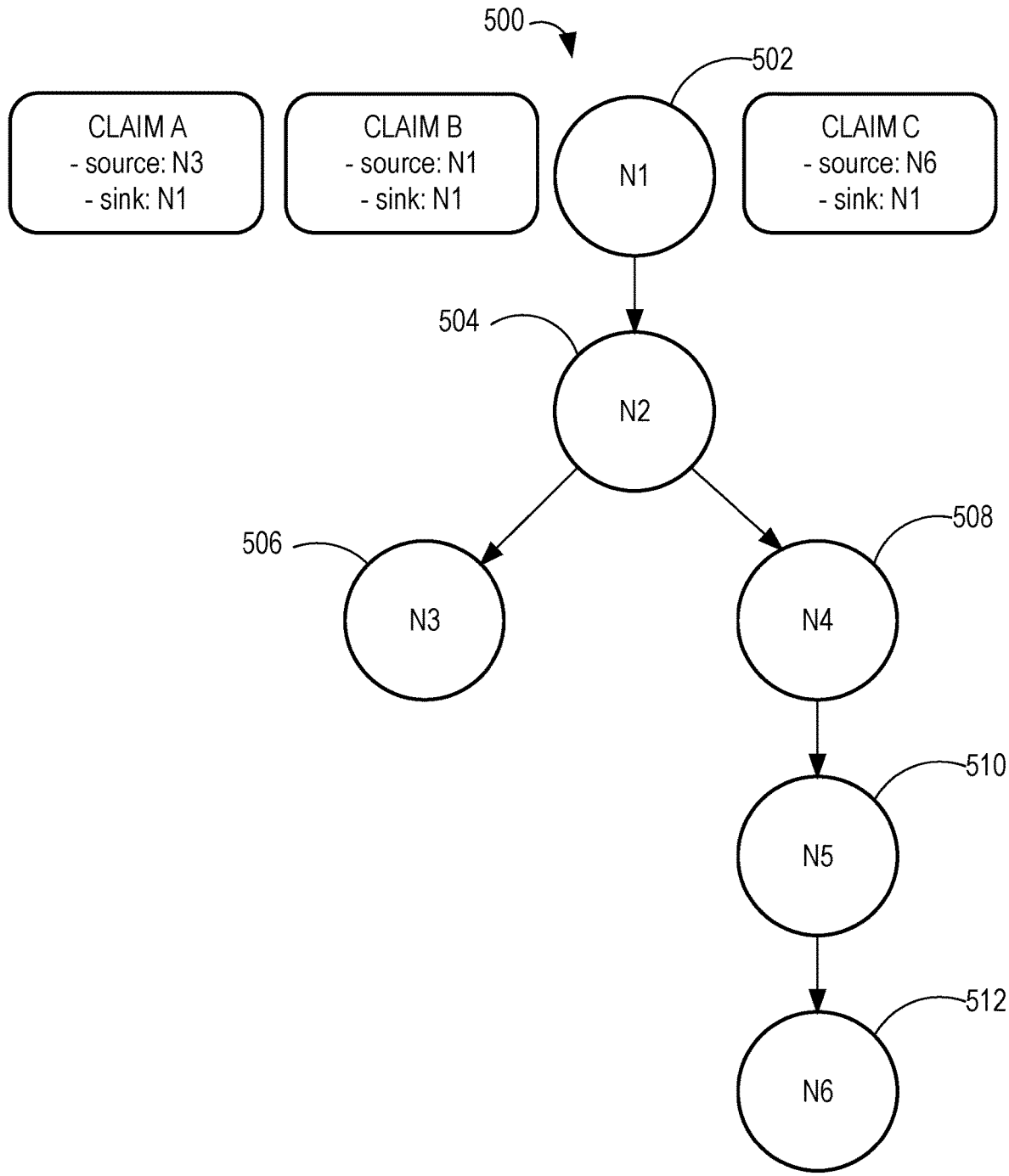
FIG. 5A-5C are block diagrams that depict an example configuration graph and multiple claims associated with the same node in configuration graph, in an embodiment.
Figure 5B:
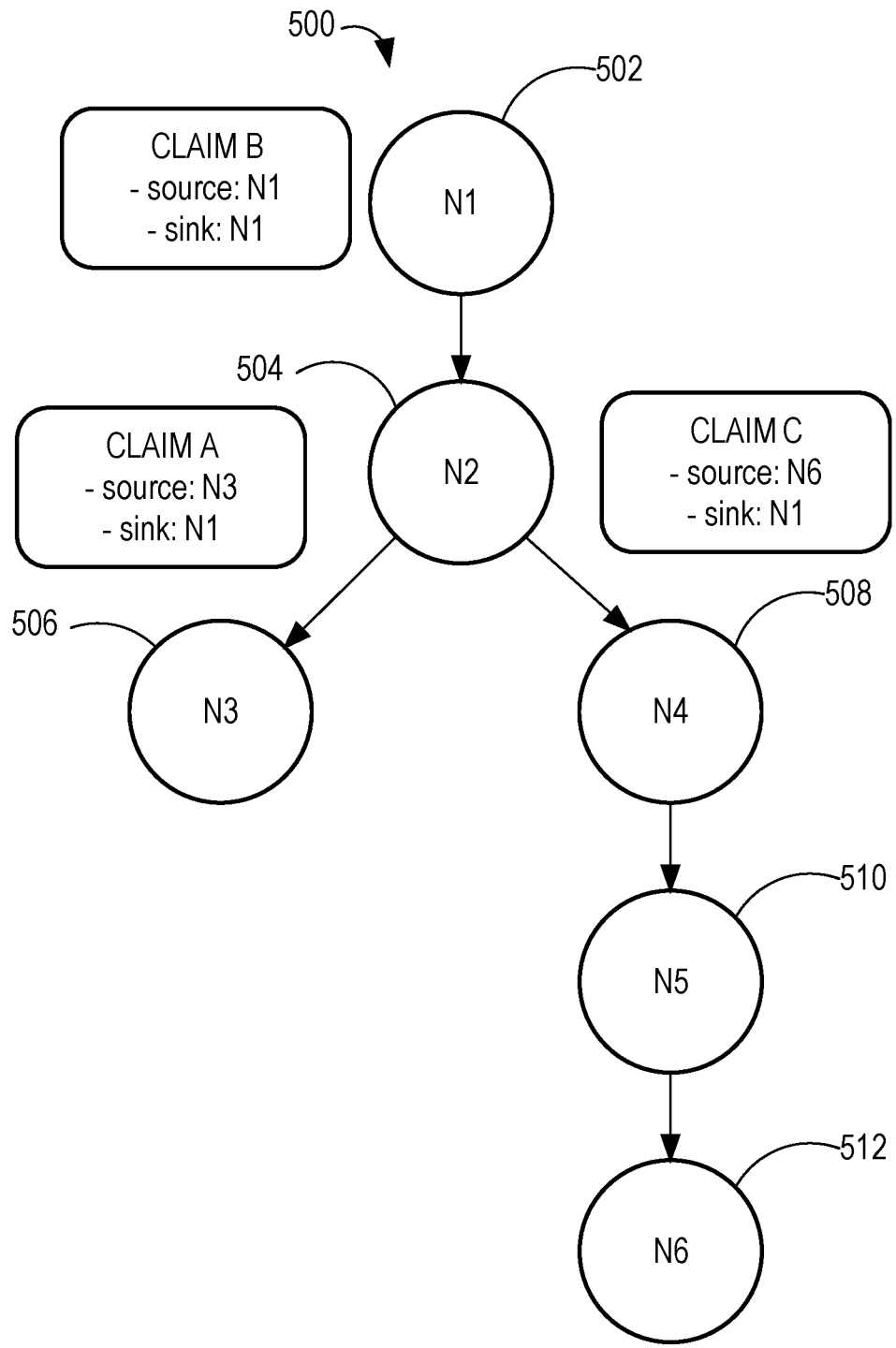
Figure 5C:
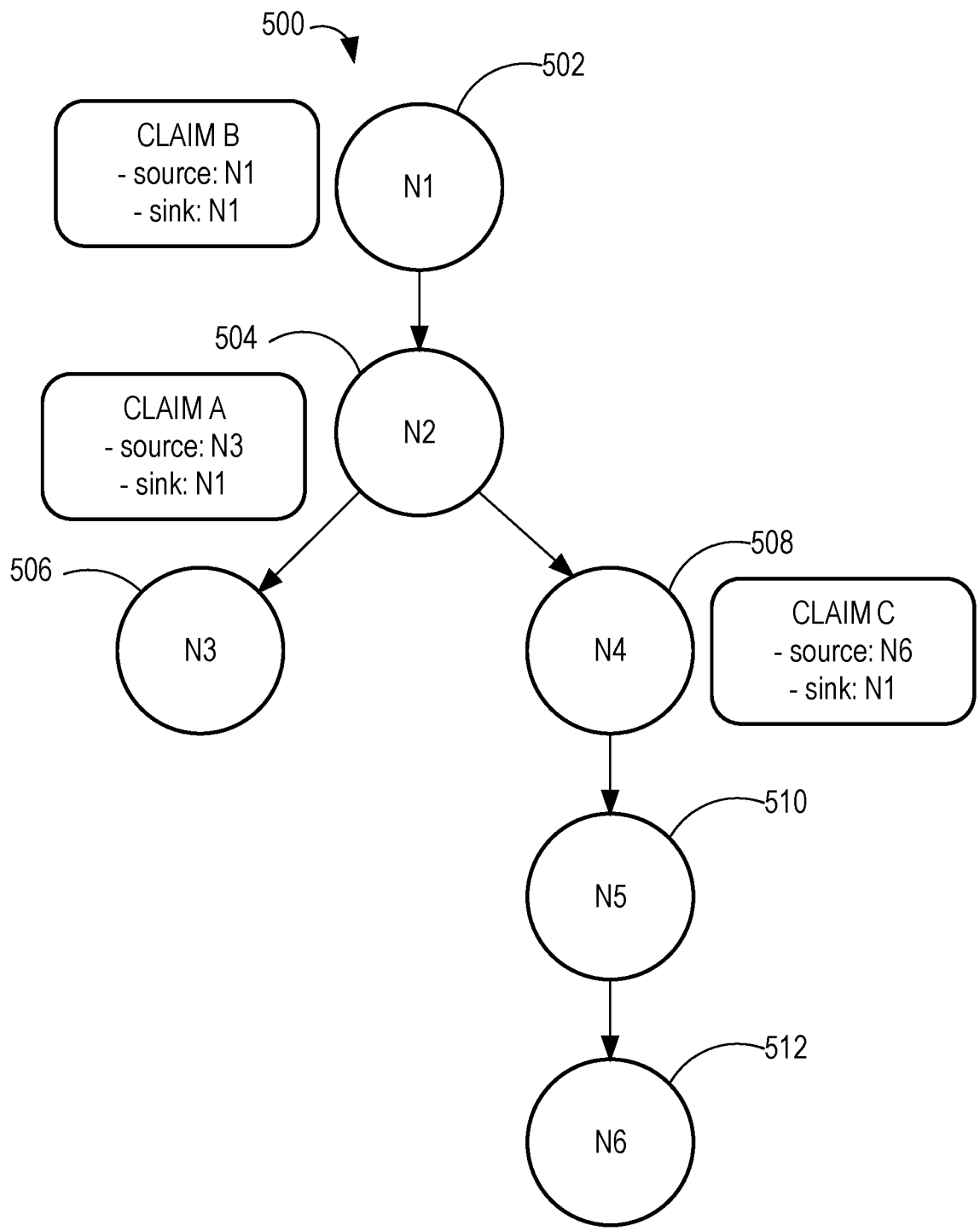

FIG. 5A-5C are block diagrams that depict an example configuration graph 500 and illustrate how multiple claims associated with the same node in configuration graph 500 may be resolved, in an embodiment. Configuration graph 500 includes N1 502 (a root node), N2 504, N3 506, N4 508, N5 510, and N6 512. N2 504 is a child node of N1 502, N3 506 and N4 508 are child nodes of N2 504, N5 510 is a child node of N4 508, and N6 512 is a child node of N5 510.

FIG. 5A indicates that, after claim propagation, there are three claims associated with N1 502: Claims A-C. Each claim indicates its source and its sink. The sink is the same for each one: N1 502. Because the sink and the source for Claim B is the same, Claim B is applied to N1 502 and the other two claims are propagated back down configuration graph 500 to the child node of N1 502, which is N2 504, which is reflected in FIG. 5B.

FIG. 5B indicates that there are two claims associated with N2 504: Claims A and C. Because the source for Claim A (i.e., N3 506) is closer to N2 504 than the source for Claim B (i.e., N6 512), Claim A is applied to N2 504 and Claim C is propagated down configuration graph 500 towards the source of Claim C, which is N4 508 in this example.

FIG. 5C indicates that there is one claim associated with N4 508. There are no nodes in configuration graph 500 that are associated with multiple claims. Therefore, claims resolution is complete.

Generated Updated Infrastructure Configuration Code

In an embodiment, one or more of these factors are considered at each node in configuration graph 148 until no node is associated with multiple claims. After all claims are applied to their respective nodes in configuration graph 148, remediation engine 140 (or another component thereof) generates updated IAC 160 based on the updated version of configuration graph 148. For example, for each node in configuration graph 148, a configuration block is generated and included in IAC 160, which initially may be empty, i.e., without any data. If the node has any attributes, then those attributes are included in the configuration block. Attributes that are optional, have no values, or are computed are not included in the configuration block. A module node is a special case where its respective attributes are stored in a file with a certain file extension, such as a .tfvars extension.

Each node in the configuration graph comes with a resource address that uniquely identifies the resource in a (e.g., Terraform) file. A resource address may be of the format <module_path>.<resource type>.<resource_name>. The <module_path> element maps to a directory in a file system. The <resource type>.<resource_name> element maps to a resource block within that directory. With this mapping, the exact file and location in the file where the resource resides for every node in the configuration graph is known. The directory path and <resource type>.<resource_name> element is sufficient in implementations that maintain the location of all resources for a particular module.

The following is example IAC code that corresponds to Original Configuration Code above, but is updated based on deployed state:

| Updated Configuration Code |
|---|
| @@ -10,7 +10,7 @@ resource "azurerm_cosmosdb_account" "tfaas_db" { <br>   resource_group_name          = "rg-dev-tfaas-1" <br>   consistency_policy { <br>     consistency_level      = "BoundedStaleness" <br> -    max_interval_seconds = 500 <br> +    max_interval_in_seconds = 300 <br>     max_staleness_prefix   = 100000 <br>   } <br>   geo_location { <br> @@ -18,4 +18,9 @@ resource "azurerm_cosmosdb_account" "tfaas_db" { <br>     location     = "southcentralus" <br>     prefix      = "" <br>   } <br> +  geo_location { <br> +    failover_priority = 1 <br> +    location     = "eastus" <br> +    prefix      = "" <br> +  } |

Differences between this Updated Configuration Code and the Original Configuration Code include the Updated Configuration Code having a new geo_location failover and updated max_interval_in_seconds marked in +.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
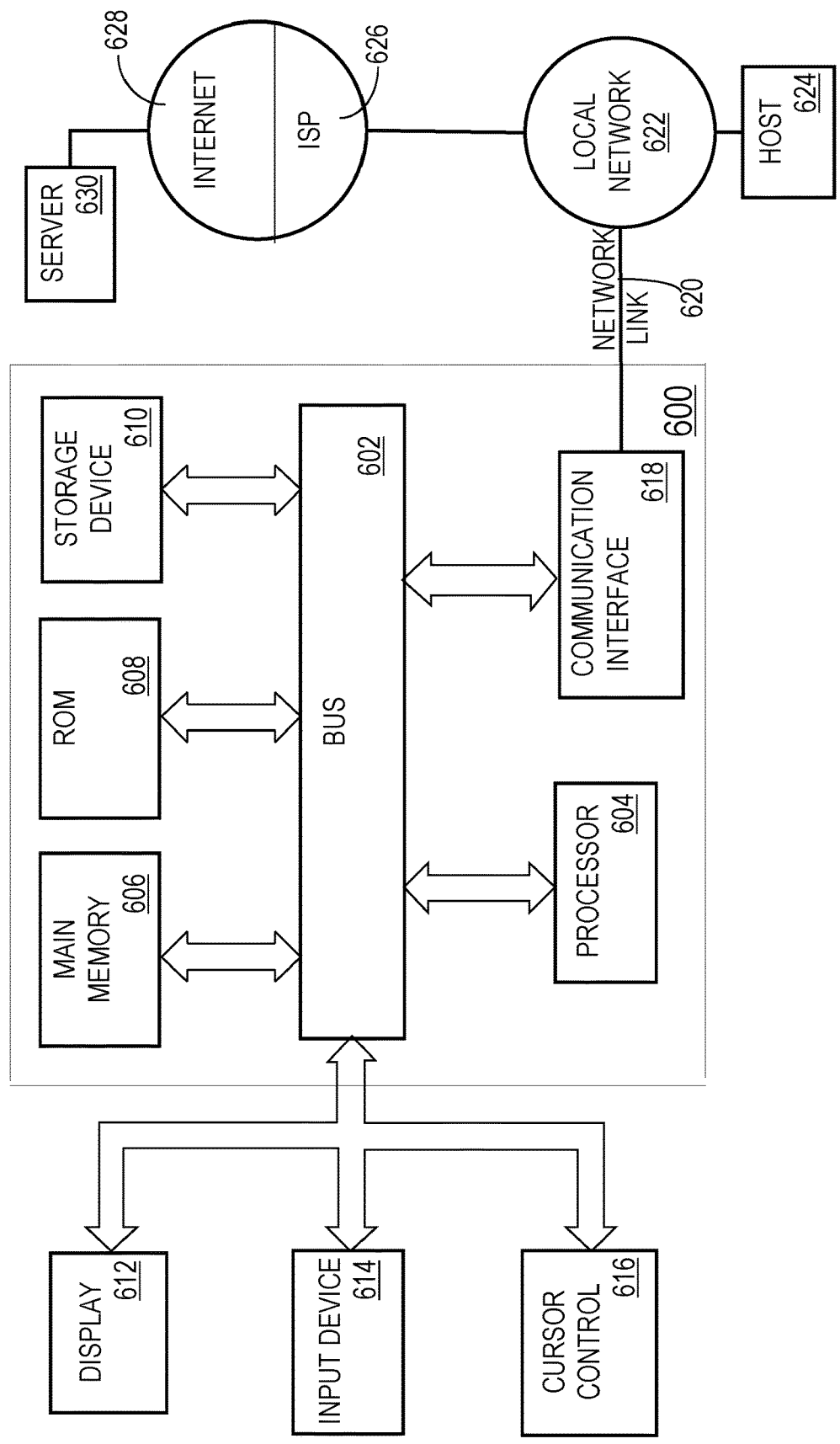
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

What is claimed is:

1. A method comprising:
   generating a configuration graph based on first infrastructure configuration code;
   generating a deployed state of a cloud infrastructure based on a data schema and a current state of the cloud infrastructure;
   matching resources indicated in the deployed state to nodes in the configuration graph;
   based on differences between the resources and the nodes, updating the configuration graph to generate an updated configuration graph, wherein updating the configuration graph comprises:
   identifying a first resource indicated in the deployed state;
   determining that the first resource corresponds to a first node of the configuration graph;
   identifying a first resource attribute in the first resource;
   identifying a first node attribute in the first node that corresponds to the first resource attribute;
   determining that a first node attribute value of the first node attribute in the first node is a reference to a second node attribute of a second node of the configuration graph;
   traversing the configuration graph beginning with the first node until a third node is reached that does not include the reference;
   creating a first claim, wherein the first claim temporarily assigns a first resource attribute value of the first resource attribute with the third node; and
   based on the updated configuration graph, generating second infrastructure configuration code that is different than the first infrastructure configuration code;
   wherein the method is performed by one or more computing devices.

2. The method of claim 1, wherein updating the configuration graph comprises:
   identifying a second resource that is indicated in the deployed state;
   determining whether the second resource corresponds to a node in the configuration graph;
   in response to determining that no node in the configuration graph corresponds to the second resource, updating the configuration graph to include information about the second resource.

3. The method of claim 1, wherein updating the configuration graph comprises:
   after matching the resources indicated in the deployed state to the nodes in the configuration graph, determining whether there are any nodes in the configuration graph that do not match to a resource in the deployed state;
   in response to determining that a node in the configuration graph does not match any resource indicated in the deployed state, updating the configuration graph by removing the node from the configuration graph.

4. The method of claim 1, further comprising:
   in response to determining that the first resource does not match the first node attribute value, updating the configuration graph to replace the first node attribute value with the first resource attribute value of the first resource attribute.

5. The method of claim 1, wherein the first claim identifies the first node, the third node, a path in the configuration graph from the first node to the third node, the first node attribute, and the first node attribute value.

6. The method of claim 1, further comprising:
   in response to determining that the first resource corresponds to the second node, determining that a second node attribute value is a second reference;
   in response to determining that the second node attribute value of the second node attribute in the second node is a second reference:
      traversing one or more second edges in the configuration graph beginning with the second node until the third node is reached;
      associating a second resource attribute value of the resource attribute of the first resource with the second node.

7. The method of claim 1, wherein updating the configuration graph comprises:
   determining that a fourth node in the configuration graph is associated with a plurality of claims that includes a second claim and a third claim, wherein the plurality of claims comprises a plurality of temporary attribute assignments, the second claim comprises a second temporary attribute assignment and the third claim comprises a third temporary attribute assignment;
   based on one or more criteria, selecting the first claim and applying the second claim to the fourth node;
   propagating the second claim down the configuration graph from the fourth node toward a source of the second claim.

8. The method of claim 7, wherein the one or more criteria includes one or more of:
   whether the second claim comprises a second claim resource attribute value that matches a second claim node attribute value;
   whether any claim of the plurality of claims has a path that is a subpath of a path of another claim of the plurality of claims; or
   which of the plurality of claims has a shortest path to its respective source.

9. One or more storage media storing instructions which, when executed by one or more processors, cause:
   generating a configuration graph based on first infrastructure configuration code;
   generating a deployed state of a cloud infrastructure based on a data schema and a current state of the cloud infrastructure;
   matching resources indicated in the deployed state to nodes in the configuration graph;
   based on differences between the resources and the nodes, updating the configuration graph to generate an updated configuration graph, wherein updating the configuration graph comprises:
   identifying a first resource indicated in the deployed state;
   determining that the first resource corresponds to a first node of the configuration graph;
   identifying a first resource attribute in the first resource;
   identifying a first node attribute in the first node that corresponds to the first resource attribute;

determining that a first node attribute value of the first node attribute in the first node is a reference to a second node attribute of a second node of the configuration graph;

traversing the configuration graph beginning with the first node until a third node is reached that does not include the reference;

creating a first claim, wherein the first claim temporarily assigns the first resource attribute value of the first resource attribute with the third node; and based on the updated configuration graph, generating second infrastructure configuration code that is different than the first infrastructure configuration code.

10. The one or more storage media of claim 9, wherein updating the configuration graph comprises:

identifying a second resource that is indicated in the deployed state;

determining whether the second resource corresponds to a node in the configuration graph;

in response to determining that no node in the configuration graph corresponds to the second resource, updating the configuration graph to include information about the second resource.

11. The one or more storage media of claim 9, wherein updating the configuration graph comprises:

after matching the resources indicated in the deployed state to the nodes in the configuration graph, determining whether there are any nodes in the configuration graph that do not match to a resource in the deployed state;

in response to determining that a node in the configuration graph does not match any resource indicated in the deployed state, updating the configuration graph by removing the node from the configuration graph.

12. The one or more storage media of claim 9, wherein the instructions, when executed by the one or more processors, further cause:

in response to determining that the first resource attribute value does not match the first node attribute value, updating the configuration graph to replace the first node attribute value with the first resource attribute value.

13. The one or more storage media of claim 9, wherein the first claim identifies the first node, the third node, a path in the configuration graph from the first node to the third node, the first node attribute, and the first node attribute value.

14. The one or more storage media of claim 9, wherein the instructions, when executed by the one or more processors, further cause:

in response to determining that the first resource corresponds to the second node, determining that a second node attribute value is a second reference;

in response to determining that the second node attribute value of the second node attribute in the second node is a second reference:

traversing one or more second edges in the configuration graph beginning with the second node until the third node is reached;

associating a second resource attribute value of the resource attribute of the first resource with the second node.

15. The one or more storage media of claim 9, wherein updating the configuration graph comprises:

determining that a fourth node in the configuration graph is associated with a plurality of claims that includes a second claim and a third claim, wherein the plurality of claims comprises a plurality of temporary attribute assignments, the second claim comprises a second temporary attribute assignment and the third claim comprises a third temporary attribute assignment;

based on one or more criteria, selecting the first claim and applying the second claim to the fourth node;

propagating the second claim down the configuration graph from the fourth node toward a source of the second claim.

16. The one or more storage media of claim 15, wherein the one or more criteria includes one or more of:

whether the second claim comprises a second claim resource attribute value that matches a second claim node attribute value;

whether any claim of the plurality of claims has a path that is a subpath of a path of another claim of the plurality of claims; or which of the plurality of claims has a shortest path to its respective source.

\* \* \* \* \*